3,796,747
L-N-ACYL-O-ETHYLTHREONINE
Burton G. Christensen, Scotch Plains, N.J., and William J. Leanza, Staten Island, N.Y., assignors to Merck & Co., Inc., Rahway, N.J.
No Drawing. Original application Dec. 22, 1967, Ser. No. 692,699, now Patent No. 3,639,382, dated Feb. 1, 1972. Divided and this application Feb. 1, 1971, Ser. No. 111,666
Int. Cl. C07c *101/04*
U.S. Cl. 260—501.11                     1 Claim

ABSTRACT OF THE DISCLOSURE

This disclosure relates to new compounds represented by O-ethyl threonine, as well as N-substituted and carboxy-substituted derivatives thereof. Several of the compounds, and especially the L-isomers, are useful in the treatment of livestock to control infection by pleuropneumonia-like organisms.

BACKGROUND OF THE INVENTION

Field of the invention

This invention relates to novel derivatives of threonine and to the use of the same in combating pleuropneumonia-like organisms in livestock.

Description of the prior art

This application is a division of applicant's copending U.S. application of Ser. No. 692,699, filed Dec. 22, 1967, and issued as U.S. Pat. 3,639,382 on Feb. 1, 1972.

One of the most serious problems in raising livestock and particularly fowl, swine and cattle, is infection by pleuropneumonia-like organisms which are responsible for a number of chronic respiratory diseases. In the fowl industry alone, it is estimated that pleuropneumonia-like organisms are responsible for losses of the order of 100 million dollars per year. Thus, there is a clear need for an agent which is capable of preventing and combating infections caused by said organisms. Additionally, pleuropneumonia-like organisms are indicated as a cause of human disabilities such as urogenital tract infections and arthritis.

Heretofore, there has been no commercial product which is completely satisfactory for routine prophylactic use against these organisms in livestock. A few compositions have been used therapeutically, but none has been found fully satisfactory even for this limited utility. Accordingly, there has not previously been available in the art any mode of treatment which satisfactorily combats or prevents livestock infections from pleuroneumonia-type organisms.

SUMMARY OF THE INVENTION

The present invention provides a novel class of threonine derivatives which exhibit a marked and unexpected activity against pleuropneumonia-like organisms (PPLO). The invention also provides methods for the prophylactic and therapeutic treatment of livestock. The invention further provides novel intermediates useful in he preparation of the PPLO-active compounds.

The compounds of this invention having anti-PPLO activity are L-O-ethyl threonine and derivatives thereof. In general, they can be represented by the formula

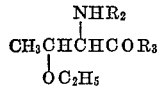

wherein $R_2$ is selected from the group consisting of hydrogen and substituents which are cleavable by body processes, e.g. aminoalkyl acyl and $R_3$ is selected from the group consisting of hydroxy, lower alkoxy, monocyclic aryloxy, preferably monocarbocyclic aryloxy, amino, hydroxamino and hydrazino. The principal active form of the O-ethyl threonine compounds is believed to be that in which the amino nitrogen is unsubstituted. The compounds are, therefore, administered in either the free amino form or in a form in which the amino nitrogen bears a substituent which is readily cleaved by body processes. The class of substituents found to be most useful in this latter regard are the acyl residues of amino acids, i.e. aminoalkyl acyl moieties of compounds such as alanine, lysine, leucine, cysteine, proline, phenylalanine, glycine, isoleucine, proline, valine, etc. The most preferred compounds for animal treatment are those in which the amino nitrogen is unsubstituted.

The substituent $R_3$ can be hydroxy, lower alkoxy, monocyclic aryloxy, amino, hydroxamino or hydrazino and the resulting O-ethyl threonine compound will be, respectively, the free acid, a lower alkyl ester, an aryl ester, an amide, an N-hydroxyamide or a hydrazide. As used herein a "lower alkyl" group is an alkyl of 1–10 carbon atoms, and preferably about 1–6 carbon atoms. The lower alkoxy, monocyclic aryloxy, amino, hydroxamino and hydrazino groups include those which are inertly substituted, i.e. which bear substituents which do not adversely affect the use of the compounds in the treatment of animals. Such substituents may include alkyl, aryl, halo, amino, hydroxy, cyclized alkylene, ester, nitro, haloalkyl, alkoxy, etc. Thus, $R_3$ can be, for example, lower alkoxy such as methoxy, ethoxy, n-propoxy, isopropoxy, n-butoxy, sec-butoxy, isobutoxy, amyloxy, hexoxy, cyclohexoxy, heptoxy, octoxy and decoxy; amino lower alkoxy such as 2-aminoethoxy, 3-aminopropoxy, 3-amino - n - butoxy, methylaminoethoxy and dimethylaminoethoxy; hydroxy lower alkoxy such as 2-hydroxyethoxy, 3-hydroxypropoxy and 3-hydroxy-n-butoxy; alkoxy lower alkoxy such as ethoxymethoxy, ethoxyethoxy, ethoxy-n-propoxy; aryl lower alkoxy such as benzyloxy and 2-phenylethoxy; haloalkoxy such as 2-chloroethoxy and 3-chloro-n-propoxy; cycloalkyl lower alkoxy such as cyclohexylmethoxy; monocyclic aryloxy such as phenoxy; alkyl monocyclic aryloxy such as toloxy and ethylphenoxy; amino monocyclic aryloxy such as aminophenoxy, ethylaminophenoxy and dimethylaminophenoxy; halo monocyclic aryloxy such as chlorophenoxy and dichlorophenoxy; hydroxy monocyclic aryloxy such as hydroxyphenoxy; nitro monocyclic aryloxy such as nitrophenoxy; nitro monocyclic aryloxy such as nitrophenoxy; haloalkyl monocyclic aryloxy such as chloromethyl phenoxy and trifluoromethyl phenoxy; alkoxy monocyclic aryloxy such as anisoxy and ethoxyphenoxy; amino; alkylamino such as methylamino, ethylamino, n-propylamino, isopropyl-amino, n-butylamino, dimethylamino, benzylamino and diethylamino; arylamino such as anilino; hydroxamino; hydrazino; and cyclized alkylene amino such as N-piperidyl and N-morpholinyl.

Examples of compounds of the invention include the following:

O-ethyl threonine;
ariginyl-O-ethyl threonine;
leucyl-O-ethyl threonine;
lysyl-O-ethyl threonine;
glycyl-O-ethyl threonine;
methyl threo-2-amino-3-ethoxybutyrate;
ethyl threo-2-amino-3-ethoxybutyrate;
isopropyl threo-2-amino-3-ethoxybutyrate;
n-butyl threo-2-amino-3-ethoxybutyrate;
methyl threo-2-arginylamino-3-ethoxybutyrate;
ethyl threo-2-lysylamino-3-ethoxybutyrate;
n-propyl threo-2-prolylamino-3-ethoxybutyrate;
threo-2-amino-3-ethoxybutyramide;
N-methyl-threo-2-amino-3-ethoxybutyramide;

N-ethyl-threo-2-amino-3-ethoxybutyramide;
N-methyl-threo-lysylamino-3-ethoxybutyramide;
N-(threo-2-amino-3-ethoxybutyryl) piperidine;
N-(threo-2-amino-3-ethoxybutyryl) morpholine;
N-hydroxy-threo-2-amino-3-ethoxybutyramide;
N-hydroxy-threo-2-leucylamino-3-ethoxybutyramide;
N-methoxy-threo-2-amino-3-ethoxybutyramide;
N-ethoxy-threo-2-amino-3-ethoxybutyramide;
threo-2-amino 3-ethoxybutyric acid hydrazide;
threo-2-amino-3-ethoxybutyric acid methyl hydrazide;
threo-2-amino-3-ethoxybutyric acid ethyl hydrazide;
threo-2-valylamino-3-ethoxybutyric acid hydrazide;

etc. The presently preferred compounds are those wherein $R_3$ is hydroxyl, i.e. the free carboxylic acids such as O-ethyl threonine. The compounds may also be used in the form of non-toxic salts, including the hydrochloride, sulfate, etc. salts of the amine group and the sodium, ammonium, calcium etc. salts of the carboxylic acid group.

It has been found that the products having anti-PPLO activity are the L-stereoisomers of the noted O-ethyl threonine compounds. The D-isomers exhibit little or no activity. It is possible to use either mixtures of the D and L forms, such as the substantially equimolar racemic mixture, or the L-isomer in the treatment of animals, but the latter is preferred. It has also been found that the corresponding allothreonine derivatives are substantially devoid of anti-PPLO activity. The O-n-propyl, O-isopropyl, O-n-butyl and higher alkyl threonine derivatives are inactive and the O-methyl derivatives exhibit a very low order of activity such that their use as anti-PPLO agents is not feasible. Accordingly, the high order of activity possessed by the instant compounds is both unique and unexpected. In addition, the compounds of this invention have been found effective in combatting coccidiosis and malaria and gram-positive bacteria such as those commonly found in turkeys, infected with PPLO. It is a particular advantage that the compounds are effective against resistant strains of PPLO which are not susceptible to treatment by known agents.

The active compounds are readily prepared from available starting materials, particularly from crotonic acid and derivatives thereof. For example, a suitable route to DL-O-ethyl threonine is shown in the following reaction sequences.

(I)
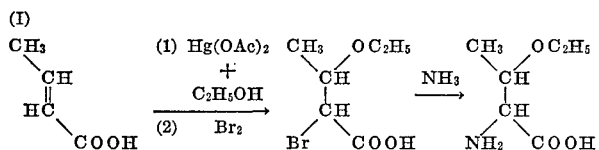

In the process illustrated in reaction sequence I, crotonic acid, mercuric acetate and ethanol are heated until all of the solids are dissolved and the solution is cooled to recover the 2-acetoxy mercuri-3-ethoxybutyric acid as a solid precipitate. The precipitate is brominated in water with bromine and potassium bromide while illuminated by a light source. The solution is then acidified and extracted to give 2-bromo-3-ethoxybutyric acid. The bromoacid compound is converted to the corresponding free amine by reaction with ammonium hydroxide to yield a mixture of threo and erythro derivatives. Separation of the threo isomer is accomplished by reaction with formic acid to give the N-formyl derivative which is recovered by fractional crystallization. The N-formyl compound can then be cleaved with acid to give O-ethyl threonine, from which the various N- and carboxy-substituted derivatives are prepared by standard techniques.

(II)
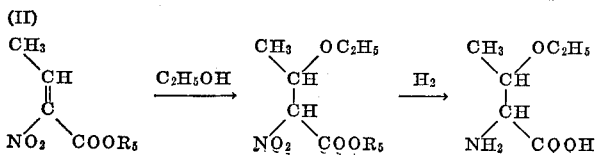

Reaction sequence II illustrates the preparation of O-ethyl threonine from an ester of 2-nitrocrotonic acid by ethoxylation of the alpha-nitro double bond with ethanol, to give the corresponding ester of 2-nitro-3-ethoxybutyric acid followed by controlled reduction of the nitro group, for example, by hydrogenation over platinum oxide. The group $R_5$ is the residue of an organic alcohol which can be readily cleaved by hydrolysis or hydrogenation; such as an aromatic or t-butyl group.

Separation of the threo isomer and preparation of derivatives thereof can be accomplished as above.

(III)
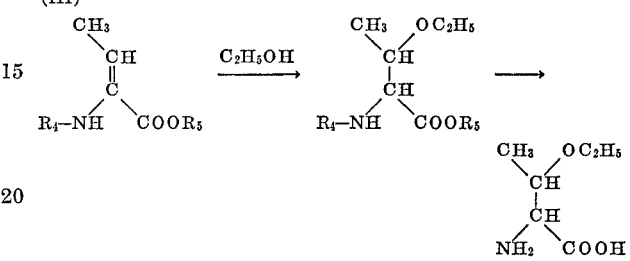

Reaction sequence III illustrates the preparation of O-ethyl threonine from an ester of an N-substituted 2-aminocrotonic acid in which $R_4$ is an acyl group and $R_5$ is the residue of an alcohol, both being readily cleaved, as by hydrolysis, to give the free amino, free carboxylic acid compound. In this sequence, $R_5$ will preferably be an aromatic group, e.g. phenyl, to facilitate the cleavage.

(IV)
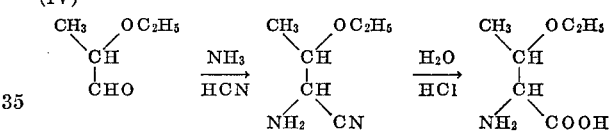

Reaction sequence IV illustrates the preparation of O-ethyl threonine from 2-ethoxypropionaldehyde by reaction with ammonia and hydrogen cyanide or ammonium chloride and alkali cyanide to form the α-aminonitrile, followed by hydrolysis of the nitrile group to the carboxylic acid.

(V)
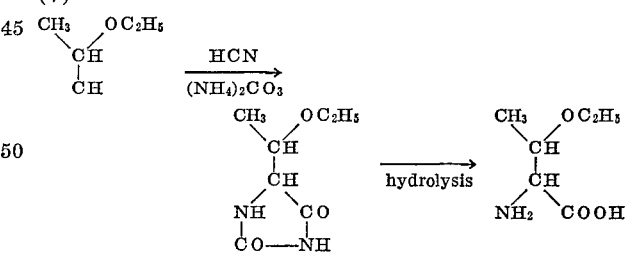

Reaction sequence V illustrates the preparation of O-ethyl threonine from 2-ethoxypropionaldehyde by reaction with ammonium carbonate and hydrogen or alkali cyanide to form the corresponding hydantoin, followed by hydrolysis of the hydantoin to the amino acid.

In each of the foregoing synthesis, the O-ethyl threonine or derivative thereof is recovered as the racemic mixture. As noted above, the racemic mixture can be used in combatting PPLO organisms. However, it is desirable to resolve the mixture to obtain substantially pure L-isomer, since that isomer possesses the highest degree of anti-PPLO activity. Resolution of the racemic mixture is most readily carried out by forming the salt of the N-acyl O-ethyl threonine and an optically active base. The resulting diastereoisomers can be separated by fractional crystallization and the salt cleaved to yield the substantially pure L-isomer. The remaining D-isomer can be recovered and used, for example, as a resolving agent for optically active bases.

The N-acyl substituent can be any acyl moiety which can be subsequently cleaved and which does not interfere with the resolution, e.g. by altering the solubility of the compound in an undesirable manner. Examples of suitable N-acyl substituted compounds are those of the formula

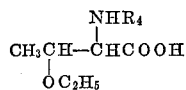

wherein $R_4$ is acyl, typically a lower alkanoyl, monocarbocyclic aroyl or aralkanoyl group such as formyl, acetyl, propionyl, butyryl, valeryl, caproyl, caprylyl, capryl, benzoyl, toluyl, phenylacetyl, phenylpropionyl and inertly substituted derivatives thereof. Examples of optically active bases which are useful in preparing the diastereoisomer salts are d- and l-α-phenylethylamine, cinchonine, quinine, quinidine, strychnine, brucine, morphine, l-menthylamine, d-2-amino-1-hydroxyhydrindine, L-arginine, and the like.

The N-acyl compounds are readily prepared from O-ethyl threonine by reaction with a reactive form of the desired acid, such as anhydride or acyl halide. The diastereoisomer salts are typically prepared by reaction of the free acid with an optically active amine, followed by fractional crystallization to separate the desired L-isomer salt. The N-acyl compounds described above are useful in the preparation of the diastereoisomer salts which, in turn, are used to produce L-O-ethyl threonine and its anti-PPLO active derivatives.

The compounds having anti-PPLO activity can be administered to livestock, especially fowl or poultry, in a number of ways. When used prophylactically, the compounds are preferably administered in the animal's feed. Suitably, the compound will be given in a dosage of about 0.005 to 0.15 gram per day per kilogram of body weight. The recommended doses are conveniently given by feeding the animal a feed composition comprising at least one element of the animal's diet and about .005 to 0.1% by weight of the compound. The lower amounts are generally suitable for routine prophylactic use and the higher levels are more commonly employed in treating an established outbreak of the infection. Therapeutic doses are generally given in the animal's water, by subcutaneous injection, in a bolus or by drench gun.

The following examples represent illustrative methods for preparing representative compounds of the invention.

EXAMPLE 1

DL-2-amino-3-ethoxybutyric acid

To a mixture of 213 gm. of mercuric acetate in one liter of anhydrous ethanol there is added 57.4 gm. of crotonic acid and the mixture is heated until all of the solids dissolve. The solution is then allowed to cool with stirring as the adduct precipitates. After 48 hours, the precipitate of 2-acetoxy-mercuri-3-ethoxybutyric acid is filtered off, washed with ethanol and dried to give 177 gm. of product, melting point 103–105° C.

The adduct is dissolved in 600 ml. of water containing 101 gm. of potassium bromide and cooled to 10° C. in an ice bath. A solution of 90 gm. of bromine and 101 gm. of potassium bromide in 168 ml. of water is added slowly with rapid stirring while the surface of the solution is illuminated with a mecury vapor lamp. At the end of the addition, excess bromine is destroyed with a small amount of sodium bisulfite. The solution is acidified with 113 ml. of 48% hydrobromic acid and extracted with four 400 ml. portions of ether. The combined ether extracts are washed with 100 ml. of cold water, dried over sodium sulfate, and evaporated to dryness to give 103 gm. of 2-bromo-3-ethoxybutyric acid.

The 2-bromo compound is dissolved in 400 ml. of concentrated ammonium hydroxide and heated in a bomb-tube for six hours at 100° C. After cooling, the excess ammonium hydroxide is evaporated and the residue placed on a column containing one pound of Dowex 50 resin on the hydrogen cycle. The column is washed with water until the effluent is neutral and is then eluted with 1 N ammonium hydroxide. The eluant fractions are recovered and tested with Ninhydrin for the present of amino acid. The fractions giving a positive test are combined and evaporated to give a residue of DL-threo and erythro-2-amino-3-ethoxybutyric acids.

EXAMPLE 2

DL-N-formyl-O-ethyl threonine 9 gm. of the crude mixture obtained from Example 1 is dissolved in 100 ml. of formic acid and 80 ml. of acetic anhydride is added. During the addition, the temperature rises to 65° C. The mixture is allowed to stand for one hour, and then is diluted with 100 ml. of water and evaporated to dryness in vacuo. Water is added and the mixture is taken to dryness several times to remove excess acid. Finally, a concentrated aqueous solution is cooled in an ice bath to crystallize. The threo-N-formyl-2-amino-3-ethoxybutyric acid (N-formyl-O-ethyl threonine) crystallizes out and is removed by filtration and recrystallized from acetone to give a melting point of 159–160° C.

EXAMPLE 3

DL-O-ethyl threonine

A solution of 1.5 gm. of the product of Example 2 in 20 ml. of 0.5 N hydrochloric acid is heated under reflux for 1.5 hours, then placed on a column containing 50 gm. of Dowex 50 resin on the hydrogen cycle. The column is washed with 500 ml. of water and eluted with 1 N ammonium hydroxide. Fractions of the eluant giving a positive amino acid test with Ninhydrin are combined and evaporated to dryness. The residue is stirred with ethanol and filtered to give 0.9 gm. of DL-O-ethyl threonine, melting point 214–216° C.

EXAMPLE 4

L-N-formyl-O-ethyl threonine

A solution is prepared from 4.5 gm. of the product of Example 2, 3.1 gm. of d-α-phenylethylamine, and 5 ml. of hot methanol and 100 ml. of acetone is added thereto. The resulting mixture is cooled to −10° C. and crystallization is induced by scratching the vessel. After two hours, the precipitate is filtered off and washed with acetone to give 1.6 gm. of the d-α-phenylethylamine salt of L-(+)-N-formyl-O-ethyl threonine in the form of stout prisms, melting point 135–136° C. $\alpha_D^{25} = +5.8°$ water (c. 1.0).

The filtrate is concentrated to one-third of its original volume, diluted with 50 ml. of acetone and again cooled to −10° C. to yield an additional 1.2 gm. of the above salt, melting point 134–135° C. The combined materials are dissolved in 10 ml. of 1 N sodium hydroxide and the released d-α-phenylethylamine extracted with three 25 ml. portions of chloroform. The aqueous layer is acidified with 10 ml. of 1 N hydrochloric acid and cooled to yield crystals of L-(+)-N-formyl-O-ethyl threonine which are filtered off and washed with a small amount of ice water. The product has a melting point of 165–166° C. and $\alpha_D^{25} = 14.3°$ water (c. 1.0).

It is sometimes found that the phenylethyl amine salt crystallizes in a differed crystalline form, fine needle melting at 125–129° C., and this form is handled in the same manner as described above.

EXAMPLE 5

L-O-ethyl threonine

The product of Example 4 is hydrolyzed with dilute hydrochloric acid according to the procedure of Example 3 to give L-(−)-O-ethyl threonine, melting point 218–219° C., $\alpha_D^{25} = -49.2°$ water (c. 1.0). Either the pure L-isomer of this example or the racemic mixture of Example 3 can be converted, by known techniques, to the N-substituted and carboxyl-substituted derivatives previously described.

EXAMPLE 6

Methyl DL-O-ethyl threnonine

Eighty mmoles (5.8 ml.) of thionyl chloride is added dropwise with stirring to 35 ml. of methanol cooled to −5° C. in a salt-ice bath. To this solution is added 75 mmoles (11 gm.) of DL-O-ethyl threonine in portions, while the temperature is maintained between 0° and −6° C. The solution is allowed to come to room temperature then heated at 40° C. for two hours. The methanol is distilled off under reduced pressure and the residual clear, thick liquid dried for one hour in vacuo over a steam bath. The product is dissolved in 5 ml. of water and the solution covered with 200 ml. of ether. Concentrated ammonium hydroxide is added until the pH of the aqueous layer reaches 8. The layers are separated and the organic layer is washed three times with 5 ml. of water, then dried over sodium sulfate. Removal of the ether leaves a crude, pale yellow liquid which is distilled to give methyl DL-O-ethyl threonine.

In a similar manner, the L-isomer of Example 5 can be substituted for the racemic mixture to give methyl L-O-ethyl threonine.

EXAMPLE 7

DL-threo-2-amino-3-ethoxybutyramide

A suspension of 60 mmoles (8.9 gm.) of DL-O-ethyl threonine in 375 ml. of dry dioxane is stirred over a water bath maintained at 40° C. Phosgene is introduced under the surface of the liquid for 4–5 hours, the amino acid dissolving completely within one hour. The reaction mixture is then sparged with nitrogen for twelve hours and the dioxane is stripped off in a rotary evaporator at 40° C. The remaining colorless crystalline N-carboxyanhydride of O-ethyl threonine is washed with ether and dried on the filter.

A solution of 31 mmoles of the N-carboxyanhydride dissolved in 50 ml. of dry tetrahydrofuran is added dropwise to 150 ml. of tetrahydrofuran saturated with ammonia over an ice bath, whereupon a white solid forms immediately. Additional ammonia is bubbled in until no further reaction is observed. The solid is filtered off and the filtrate stripped of tetrahydrofuran to give a yellow liquid. The filtered solid is leached with hot ethyl acetate, filtered and the filtrate stripped of ethyl acetate to give additional yellow liquid. The combined products are distilled under vacuum to give DL-threo-2-amino-3-ethoxybutyramide.

In a similar manner, replacement of the DL-O-ethyl threonine by the L-isomer of Example 5 gives the L-isomer of the amide.

EXAMPLE 8

DL-threo-2-amino-3-ethoxybutyric acid hydrazide

A mixture of 0.04 mole of ester of DL-O-ethyl threonine and 10 ml. of ethanol is heated under reflux with 2.0 ml. of hydrazine hydrate for three hours and is allowed to stand overnight. The solvent is stripped under vacuum to give a colorless oil which crystallizes on standing to give hygroscopic crystals of DL-threo-2-amino-3-ethoxybutyric acid hydrazide.

EXAMPLE 9

DL-threo-2-amino-3-ethoxy-N-hydroxy-butyramide

Separate solutions of 96 mmoles of hydroxylamine hydrochloride in 35 ml. of methanol and 144 mmoles of potassium hydroxide in 20 ml. of methanol are prepared at the boil. Both are cooled slightly and the hydroxide solution is added, with stirring, to the hydroxylamine solution. The mixture is then cooled in an ice bath to complete precipitation of the potassium chloride. A quantity of 48 mmoles of the methyl ester of DL-O-ethyl threonine is added with stirring and the mixture filtered immediately. The solid is washed with methanol and the combined filtrates are treated with an additional 48 mmoles of hydroxylamine hydrochloride to neutralize excess potassium hydroxide, and the solution is again filtered. The filtrate deposits crystals on standing overnight. The crystals are collected and sublimed to give DL-threo-2-amino-3-ethoxy-N-hydroxybutyramide.

The unique anti-PPLO activity of the compounds of this invention is demonstrated by the following.

EXAMPLE 10

A flock of chickens is artificially infected with pleuropneumonia-like organisms. Statistically significant groups of chickens from this flock are then treated with each of the test compounds, at a range of levels, by subcutaneous injection of the compound in a sterile aqueous medium. The total dosage is given in two separate equal injections, one immediately after infection and the other six hours later. All of the chickens from each group are tested for control of the infection and the dosage level giving an average of 50% control in the group is calculated. The results obtained are as follows.

| Compound: | Dosage for 50% control (mg./kg. of body weight) |
|---|---|
| L-O-ethyl threonine | 40 |
| L-isoleucyl L-O-ethyl threonine | 76 |
| Glycyl L-O-ethylthreonine | 80 |
| DL-O-ethyl threonine | 80 |
| L-O-n-propyl threonine | [1] >250 |
| L-O-isopropyl threonine | [1] >250 |
| L-O-methyl threonine | 440 |
| DL-O-ethyl allothreonine | [1] >250 |
| DL-O-methyl allothreonine | [1] >250 |
| DL-O-n-propyl allothreonine | [1] >250 |
| DL-O-isopropyl allothreonine | [1] >250 |

[1] No indication of control of infection at 250 mg./kg. in any of the test animals.

From the results shown above, it can readily be seen that the compounds of the invention are unique in their ability to combat PPLO infections, whereas their most closely related homologs and isomers are either totally devoid of activity or possess activity of such a low order that their use is not feasible.

EXAMPLE 11

Groups of eight day old White Leghorn chicks (10 birds per group) are infected with 1.0 ml. per bird of a culture of *Mydoplasma gallisepticum* at dilutions of $10^{-5}$, $10^{-6}$ and $10^{-7}$. The infected chicks are fed a diet containing 0.02% by weight of L-O-ethylthreonine for a period of ten days commencing 24 hours after infection and are sacrificed on the eleventh day.

It is found that the 0.02% level of L-O-ethylthreonine is effective in controlling the infection. Air sac exudate is completely eliminated in all chicks at all dilution levels. Similar results are observed when the compound is administered in drinking water at a level of 0.04% by weight.

What is claimed is:

1. D-α-phenethylamine salt of L(+)-N-formyl-O-ethylthreonine.

References Cited

UNITED STATES PATENTS 3,410,891  11/1968  Hughes _____ 260—501.11

FOREIGN PATENTS 544,304  7/1957  Canada _____ 260—534

OTHER REFERENCES

Eliel: Stereochemistry of Carbon Compounds, McGraw-Hill Book Co., New York, pp. 49–51 (1962).

LEON ZITVER, Primary Examiner

M. W. GLYNN, Assistant Examiner